(12) United States Patent
Gruber et al.

(10) Patent No.: US 11,645,813 B2
(45) Date of Patent: May 9, 2023

(54) TECHNIQUES FOR SCULPTING DIGITAL FACES BASED ON ANATOMICAL MODELING

(71) Applicants: DISNEY ENTERPRISES, INC., Burbank, CA (US); ETH Zürich (Eidgenössische Technische Hochschule Zürich), Zürich (CH)

(72) Inventors: Aurel Gruber, Zürich (CH); Marco Fratarcangeli, Gothenburg (SE); Derek Edward Bradley, Zürich (CH); Gaspard Zoss, Zürich (CH); Dominik Thabo Beeler, Egg (CH)

(73) Assignees: DISNEY ENTERPRISES, INC., Burbank, CA (US); ETH ZÜRICH (EIDGENÖSSISCHE TECHNISCHE HOCHSCHULE ZÜRICH), Zürich (CH)

( * ) Notice: Subject to any disclaimer, the term of this patent is extended or adjusted under 35 U.S.C. 154(b) by 0 days.

(21) Appl. No.: 16/921,871

(22) Filed: Jul. 6, 2020

(65) Prior Publication Data
US 2022/0005268 A1 Jan. 6, 2022

(51) Int. Cl.
*G06T 17/20* (2006.01)
*G06T 7/60* (2017.01)

(52) U.S. Cl.
CPC .............. *G06T 17/20* (2013.01); *G06T 7/60* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 8,922,553 B1 * | 12/2014 | Tena | G06T 13/00 345/423 |
| 9,652,890 B2 | 5/2017 | Beeler et al. | |
| 10,949,648 B1 * | 3/2021 | Cao | G06T 7/251 |
| 2009/0185723 A1 * | 7/2009 | Kurtz | G06V 40/50 382/118 |

(Continued)

OTHER PUBLICATIONS

Allen et al., "The space of human body shapes:reconstruction and parameterization from range scans", In ACM SIGGRAPH 2003 Papers, ACM, 2003, pp. 587-594.

(Continued)

*Primary Examiner* — Tize Ma
(74) *Attorney, Agent, or Firm* — Artegis Law Group, LLP

(57) ABSTRACT

Techniques are disclosed for creating digital faces. In some examples, an anatomical face model is generated from a data set including captured facial geometries of different individuals and associated bone geometries. A model generator segments each of the captured facial geometries into patches, compresses the segmented geometry associated with each patch to determine local deformation subspaces of the anatomical face model, and determines corresponding compressed anatomical subspaces of the anatomical face model. A sculpting application determines, based on sculpting input from a user, constraints for an optimization to determine parameter values associated with the anatomical face model. The parameter values can be used, along with the anatomical face model, to generate facial geometry that reflects the sculpting input.

20 Claims, 10 Drawing Sheets

(56) References Cited

U.S. PATENT DOCUMENTS

| | | | | |
|---|---|---|---|---|
| 2010/0075274 | A1* | 3/2010 | Klett | A61C 11/006 433/56 |
| 2010/0214290 | A1* | 8/2010 | Shiell | G06T 17/20 345/420 |
| 2016/0328628 | A1* | 11/2016 | Bhat | G06T 13/40 |
| 2017/0091994 | A1* | 3/2017 | Beeler | G06T 17/20 |
| 2019/0122411 | A1* | 4/2019 | Sachs | G06T 7/248 |
| 2019/0295302 | A1* | 9/2019 | Fu | G06T 7/0002 |

OTHER PUBLICATIONS

Lewis et al., "Direct-Manipulation Blendshapes", IEEE Computer Graphics and Applications, vol. 30, No. 4, Jul./Aug. 2010, pp. 42-50.

Agarwal et al., "Ceres Solver", Retreived from http://ceres-solver.org. on Aug. 8, 2020, 2010, 1 page.

Beeler et al., "Rigid Stabilization of Facial Expressions", DOI: http://dx.doi.org/10.1145/2601097.2601182, ACM Transactions on Graphics, vol. 33, No. 4, Article 44, Jul. 2014, pp. 44:1-44:9.

Beeler et al., "High-Quality Single-Shot Capture of Facial Geometry", http://doi.acm.org/10.1145/1778765.1778777, ACM Transactions on Graphics, vol. 29, No. 4, Article 40, Jul. 2010, pp. 40:1-40:9.

Booth et al., "Large Scale 3D Morphable Models", https://doi.org/10.1007/s11263-017-1009-7, International Journal of Computer Vision, vol. 126, No. 2, 2018, pp. 233-254.

Blanz et al., "A Morphable Model for the Synthesis of 3D Faces", In Computer Graphics and Interactive Techniques, SIGGRAPH '99, 1999, Abstract.

Bouaziz et al., "Online Modeling for Realtime Facial Animation", DOI: http://doi.acm.org/10.1145/2461912.2461976, ACM Transactions on Graphics, vol. 32, No. 4, Article 40, Jul. 2013, pp. 40:1-40:9.

Cong et al., "Fully Automatic Generation of Anatomical Face Simulation Models", DOI: http://dx.doi.org/10.1145/2786784.2786786, In ACM SIGGRAPH / Eurographics Symposium on Computer Animation, Aug. 7-9, 2015, pp. 175-183.

Cetinaslan et al., "Sketch-Based Controllers for Blendshape Facial Animation", DOI: 10.2312/egsh.20151006, In Eurographics 2015—Short Papers (2015), Bickel B., Ritschel T., (Eds.), The Eurographics Association, 2015, Abstract.

Fratarcangeli et al., "Fast Nonlinear Least Squares Optimization of Large-Scale Semi-Sparse Problems", Computer Graphics Forum (Eurographics), DOI: 10.1111/cgf.13927, vol. 39, No. 2, 2020, pp. 247-259.

Fratarcangeli, Marco, "Position-based facial animation synthesis", DOI: 10.1002/cav.1450, Computer Animation and Virtual Worlds, vol. 23, 2012, pp. 457-466.

Gecer et al., "Synthesizing Coupled 3D Face Modalities by Trunk-Branch Generative Adversarial Networks", arXiv:1909.02215, 2019, pp. 1-11.

Goodfellow et al., "Generative Adversarial Nets", In Advances in Neural Information Processing Systems, vol. 27, Curran Associates, Inc., 2014, pp. 2672-2680.

Ichim et al., "Phace: Physics-based Face Modeling and Animation", DOI: http://dx.doi.org/10.1145/3072959.3073664, ACM Transactions on Graphics, vol. 36, No. 4, Article 153, Jul. 2017, pp. 153:1-153:14.

Kahler et al., "Reanimating the Dead: Reconstruction of Expressive Faces from Skull Data", ACM Transactions on Graphics, vol. 22, No. 3, 2003, pp. 554-561.

Li et al., "Learning a model of facial shape and expression from 4D scans", https://doi.org/10.1145/3130800.3130813, ACM Transactions on Graphics, vol. 36, No. 6, Article 194, Nov. 2017, pp. 194:1-194:17.

Lau et al., "Face Poser: Interactive Modeling of 3D Facial Expressions Using Model Priors", Eurographics/ACM SIGGRAPH Symposium on Computer Animation, Aug. 4-5, 2007, pp. 161-170.

Li et al., "Example-Based Facial Rigging", http://doi.acm.org/10.1145/1778765.1778769, ACM Transactions on Graphics, vol. 29, No. 4, Article 32, Jul. 2010, pp. 32:1-32:6.

Moschoglou et al., "3DFaceGAN: Adversarial Nets for 3D Face Representation, Generation, and Translation", arXiv:1905.00307, 2019, pp. 1-15.

Neumann et al., "Sparse Localized Deformation Components", DOI: http://dx.doi.org/10.1145/2508363.2508417, ACM Transactions on Graphics, vol. 32, No. 6, Article 179, Nov. 2013, pp. 179:1-179:10.

Paysan et al., "A 3D Face Model for Pose and Illumination Invariant Face Recognition", 2009 Advanced Video and Signal Based Surveillance, DOI 10.1109/AVSS.2009.58, Sep. 2009, pp. 296-301.

Sorkine et al., "Laplacian Surface Editing", Eurographics Symposium on Geometry Processing, 2004, pp. 175-184.

Seo et al., "Compression and Direct Manipulation of Complex Blendshape Models", In SIGGRAPH, http://doi.acm.org/10.1145/2024156.2024198, ACM Transactions on Graphics, vol. 30, No. 6, Article 164, Dec. 2011, pp. 164:1-164:10.

Sifakis et al., "Automatic Determination of Facial Muscle Activations from Sparse Motion Capture Marker Data", In ACM SIGGRAPH 2005 Papers, SIGGRAPH 05, Association for Computing Machinery, 2005, pp. 417-425.

Tena et al., "Interactive Region-Based Linear 3D Face Models", http://doi.acm.org/10.1145/1964921.1964971, ACM Transactions on Graphics, vol. 30, No. 4, Article 76, Jul. 2011, pp. 76:1-76:10.

Terzopoulos et al., "Physically-based Facial Modelling, Analysis, and Animation", The Jornal of Visualization and Computer Animation, vol. 1, No. 2, Mar. 1990, pp. 73-80.

Thies et al., "Real-time Expression Transfer for Facial Reenactment", DOI: http://doi.acm.org/10.1145/2816795.2818056, ACM Transactions on Graphics, vol. 34, No. 6, Article 183, Nov. 2015, pp. 183:1-183:14.

Wu et al., "An Anatomically-Constrained Local Deformation Model for Monocular Face Capture", DOI: http://dx.doi.org/10.1145/2897824.2925882, ACM Trans. Graph., vol. 35, No. 4, Article 115, Jul. 2016, pp. 115:1-115:12.

Yumer et al., "Semantic Shape Editing Using Deformation Handles", DOI: http://doi.acm.org/10.1145/2766908, ACM Transactions on Graphics, vol. 34, No. 4, Article 86, Aug. 2015, pp. 86:1-86:12.

Yumer et al., "Co-Constrained Handles for Deformation in Shape Collections", DOI: http://doi.acm.org/10.1145/2661229.2661234, ACM Transactions on Graphics, vol. 33, No. 6, Article 187, Nov. 2014, pp. 187:1-187:11.

Zoss et al., "Accurate Markerless Jaw Tracking for Facial Performance Capture", https://doi.org/10.1145/3306346.3323044, ACM Trans. Graph., vol. 38, No. 4, Article 50, Jul. 2019, pp. 50:1-50:8.

* cited by examiner

TECHNIQUES FOR SCULPTING DIGITAL FACES BASED ON ANATOMICAL MODELING

BACKGROUND

Technical Field

Embodiments of the present disclosure relate generally to computer science and computer graphics and, more specifically, to techniques for sculpting digital faces based on anatomical modeling.

Description of the Related Art

Realistic digital faces are required for various computer graphics and computer vision applications. For example, digital faces oftentimes are used in the virtual scenes of film productions and in video games.

Digital faces can be created using free-form sculpting tools. Commercially-available sculpting tools, such as ZBrush®, Mudbox®, and Maya®, permit significant artistic freedom in sculpting digital faces by hand. However, manual sculpting of digital faces requires a user to be skilled at free-form sculpting and is oftentimes labor intensive. Using a conventional sculpting tool, a skilled user can spend weeks, or even months, creating a single digital face.

One approach that allows users who are not skilled at free-form sculpting to create digital faces involves generating the digital faces using predetermined libraries of exemplar faces (e.g., blendshape models), from which the users can select and blend different three-dimensional (3D) geometries together, in order to create new faces. However, such an approach limits the digital faces that can be created to the exemplar faces and blendings of those faces. As a result, users may not be able to create digital faces with desired characteristics.

As the foregoing illustrates, what is needed in the art are more effective techniques for creating digital faces for works, such as, and without limitation, film productions, video games, and the like.

SUMMARY

One embodiment of the present disclosure sets forth a computer-implemented method for generating a digital face. The method includes generating a model based on a plurality of different faces associated with a plurality of different individuals, where the model comprises a plurality of local deformation subspaces defining how patches of skin deform and a plurality of anatomical subspaces defining at least one of how the patches slide on underlying bones, which directions the patches slide, or skin thicknesses associated with the patches. The method further includes performing one or more optimization operations based on the model and one or more constraints to determine parameter values associated with the model. In addition, the method includes generating three-dimensional (3D) facial geometry based on the parameter values and the model.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that the disclosed techniques enable digital faces with a wide variety of characteristics to be created by users who are not skilled at free-form sculpting. In addition, the disclosed techniques enable realistic-looking digital faces to be created in shorter amounts of time relative to prior art approaches, such as free-form sculpting. These technical advantages represent one or more technological improvements over prior art approaches.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
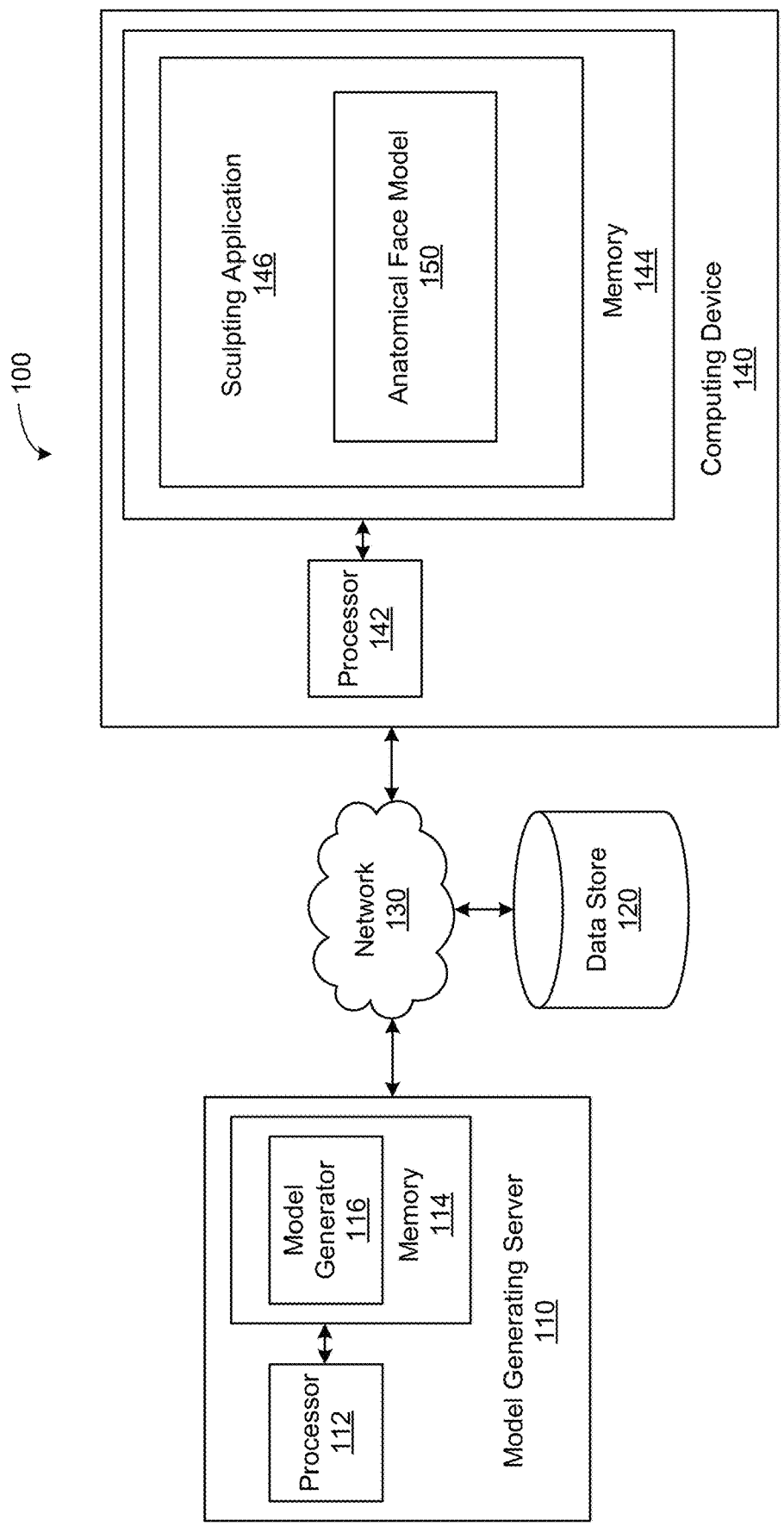
FIG. 1 illustrates a system configured to implement one or more aspects of the various embodiments.

FIG. 1 illustrates a system 100 configured to implement one or more aspects of the various embodiments. As shown, the system 100 includes a model generating server 110, a data store 120, and a computing device 140 in communication over a network 130, which may be a wide area network (WAN) such as the Internet, a local area network (LAN), or any other suitable network.

As shown, a model generator 116 executes on a processor 112 of the model generating server 110 and is stored in a system memory 114 of the model generating server 110. The processor 112 receives user input from input devices, such as a keyboard, a mouse or a touchscreen. In operation, the processor 112 is the master processor of the model generating server 110, controlling and coordinating operations of other system components. In particular, the processor 112 may issue commands that control the operation of a graphics processing unit (GPU) that incorporates circuitry optimized for graphics and video processing, including, for example, video output circuitry. The GPU may deliver pixels to a display device that may be any conventional cathode ray tube, liquid crystal display, light-emitting diode display, or the like.

The system memory 114 of the model generating server 110 stores content, such as software applications and data, for use by the processor 112 and the GPU. The system memory 114 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the system memory 114. The storage may include any number and type of external memories that are accessible to the processor 112 and/or the GPU. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the model generating server 110 shown herein is illustrative and that variations and modifications are possible. For example, the number of processors 112, the number of GPUs, the number of system memories 114, and the number of applications included in the system memory 114 may be modified as desired. Further, the connection topology between the various units in FIG. 1 may be modified as desired. In some embodiments, any combination of the processor 112, the system memory 114, and a GPU may be replaced with any type of virtual computing system, distributed computing system, or cloud computing environment, such as a public, private, or a hybrid cloud.

The model generator 116 is configured to generate an anatomical face model 150 based on a data set of captured facial geometry and associated bone geometry. The anatomical face model 150 is a parametric model that can be used to determine parameter values for generating new facial geometry corresponding to user sculpting inputs, such as directly manipulating one or more vertices on facial geometry representing the skin of a face or indirectly specifying a characteristic of the face (e.g., a sex, age, ethnicity, and/or body mass index (BMI) associated with the face). Although described herein primarily with respect to vertices, in other embodiments, a user may be permitted to directly manipulate any point (e.g., points within triangles) on the smooth surface of facial geometry. In some embodiments, the anatomical face model 150 includes local deformation subspaces defining how different patches of skin on a face can move and deform by stretching, bending, and/or compressing, as well as anatomical subspaces (one per patch) defining how much the patches slide on underlying bone, which directions the patches slide, and skin thicknesses associated with the patches. Each of the patches corresponds to a region of skin on the face and is associated with a set of non-rigid motion deformation parameters defining the deformation of the patch, such as stretching and/or bending of the patch, as well as a set of rigid motion parameters defining movement of the patch, such as a translation and/or a rotation affecting the position of the patch. Use of the non-rigid motion deformation parameters and the rigid motion parameters separates the local deformation of each patch from the local motion of the patch. Any technically feasible patch layout may be used. For example, the patch layout could be a grid layout, except for around the eyes, nose, and mouth, where patches instead conform to the shape of the face. In some embodiments, the patch layout is specified by a user as input (e.g., using a texture image). In some embodiments, the patches are also coupled with a global parameter defining the rigid transformation of the underlying bony structure, and the anatomical face model 150 is further regularized by anatomical constraints, such as a skin thickness subspace using the underlying skull and jaw bones. Techniques for generating the anatomical face model 150 are discussed in greater detail below in conjunction with FIG. 2.

Once generated, the anatomical face model 150 can be used in an optimization (also referred to herein as "optimization operation(s)") to solve for parameter values specifying (1) weights for combining different compressed patch geometries associated with the local deformation subspaces, and (2) rigid motions (including the direction and magnitude of movement) of every patch, as discussed in greater detail below in conjunction with FIG. 2. Such parameter values can then be used to generate new facial geometry by, among other things, deforming and moving the patches based on the parameter values, and stitching the resulting patches together. In some embodiments, generating the new facial geometry includes combining the different compressed patch geometries associated with each local deformation subspace in a linear combination that is weighted by weight parameter values and transformed by a rigid transformation specified by rigid motion parameter values, as discussed in greater detail below in conjunction with FIG. 2.

Data sets and/or anatomical face models, including the anatomical face model 150, may be stored in the data store 120 and deployed in any suitable applications, such as a sculpting application 146 that uses the anatomical face model 150 to generate new facial geometry based on sculpting inputs from a user. In some embodiments, the data store 120 may include any storage device or devices, such as fixed disc drive(s), flash drive(s), optical storage, network attached storage (NAS), and/or a storage area-network (SAN). Although shown as accessible over the network 130, in some embodiments the model generating server 110 may include the data store 120.

Illustratively, the sculpting application 146 is stored in a memory 144, and executes on a processor 142 of the computing device 140. Components of the computing device 140, including the memory 144 and the processor 142, may be similar to corresponding components of the model generating server 110. As shown, the sculpting application 146 includes the anatomical face model 150, which as described can be used to generate new facial geometry based on user sculpting inputs.

More generally, the anatomical face model 150 may be deployed to any suitable applications. In addition, the number of model generating servers and computing devices may be modified as desired. Further, the functionality included in any of the applications may be divided across any number of applications or other software that are stored and execute via any number of devices that are located in any number of physical locations.

Creating Digital Faces Using an Anatomical Face Model

Figure 2:
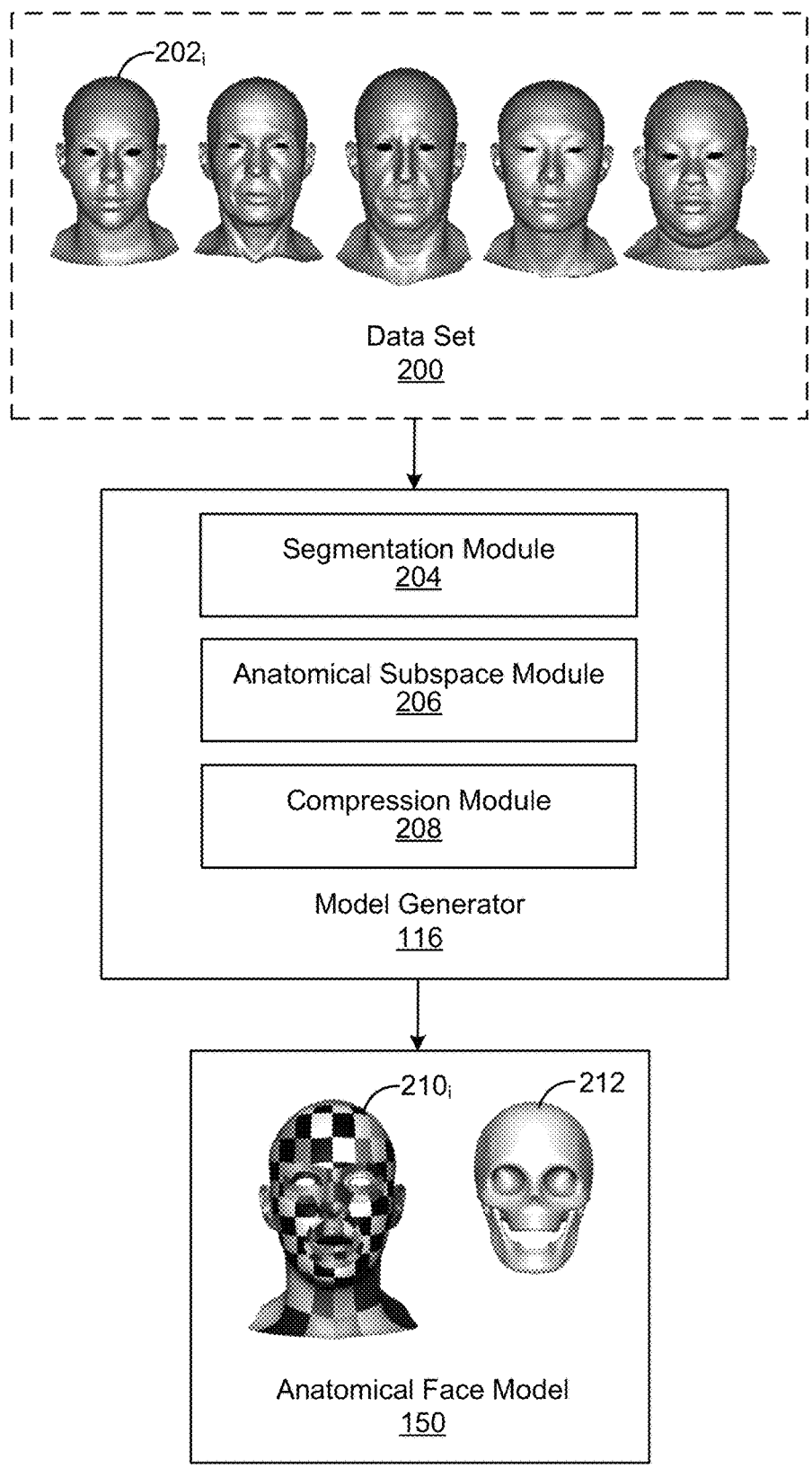
FIG. 2 is a more detailed illustration of the model generator of FIG. 1, according to various embodiments.

FIG. 2 is a more detailed illustration of the model generator 116 of FIG. 1, according to various embodiments. As shown, the model generator 116 takes as inputs a data set 200 that includes captured facial geometries $202_i$ (collectively referred to herein as "facial geometries 202" and individually referred to herein as "a facial geometry") of different individuals with neutral expressions. The facial geometries 202 share a same topology, i.e., the facial geometries 202 have the same number of vertices and the same edge connectivity. The model generator 116 can also receive bone geometry (not shown), including the geometries of skull and jaw bones, that are associated with the facial geometries 202. The facial geometries 202 and associated bone geometries can be obtained in any technically feasible manner. For example, well-known facial capture techniques could be used to capture the facial geometries 202, and the associated bone geometries could be provided by a user or determined by deforming and fitting a template skull inside of the facial geometries 202. Although five facial geometries 202 are shown for illustrative purposes, the data set 200 can generally include any number (e.g., hundreds) of captured facial geometries of different individuals and associated bone geometries. In addition, techniques disclosed herein can be extended to captured facial geometries (and associated bone geometries) that include expressions other than the neutral expression.

Given the data set 200 as input, the model generator 116 generates the anatomical face model 150 which can, in turn, be used to generate new facial geometry. Essentially, the anatomical face model 150 learns, based on the facial geometries 202 and corresponding bone geometries in the data set 200, how different patches 2101 (collectively referred to herein as "patches 210" and individually referred to herein as "a patch 210") of skin on a face can deform, how those patches 210 slide over underlying bones, and how skin thickness changes when the patches 210 slide over the bones. Because the data set 200 illustrated in the example of FIG. 2 includes captured facial geometries with the neutral expression, the generated facial geometry will also have the neutral expression. In cases where the data set 200 includes captured facial geometry with other expressions (e.g., smiling, frowning, etc.), facial geometry can also be generated with those expressions.

In some embodiments, the anatomical face model 150 includes local deformation subspaces that model how the patches 210 of skin on a face can deform by bending, stretching, and/or compressing. Any number of patches can be used in embodiments. For example, experience has shown that 165 patches provide a reasonable trade-off between local deformation and computation time. Each of the patches 210 is represented by an average of multiple patch geometries associated with the patch 210, and deformations can be represented by changes from the average of the multiple patch geometries. In some embodiments, deformations needed to create multiple compressed patch geometries, discussed in greater detail below, are transformed into an average space associated with the average patch geometry for each patch. In addition, the anatomical face model 150 includes anatomical subspaces modeling how much respective patches 210 slide on underlying bone 212, which directions the patches 210 slide, and skin thicknesses associated with the patches 210, including skin thickness changes associated with sliding. In some embodiments, the skin thickness may be an average thickness from the skin of a real human face (i.e., the epidermis) to the bones under the face. For example, assume there are three deformations $D_1$, $D_2$, and $D_3$ that are associated with compressed patch geometries and represent changes from an average shape A of a particular patch. In such a case, an optimization may be used to solve for model parameter values including weights $w_1$, $w_2$, $w_3$, as well as a rotation R and a translation T of rigid motion of a particular patch, such that the final patch geometry can be computed as $R(A+w_1D_1+w_2D_2+w_3D_3)+T$. It should be noted that the weights $w_1$, $w_2$, $w_3$ also dictate sliding and skin thickness changes over the underlying bone. In particular, each deformation $D_1$, $D_2$, $D_3$ can have a corresponding thickness $H_1$, $H_2$, $H_3$ and sliding amount $S_1$, $S_2$, $S_3$, respectively, such that the solved weight values $w_1$, $w_2$, $w_3$ optimize both shape and sliding.

To generate the anatomical face model 150, a segmentation module 204 in the model generator 116 first segments each of the captured facial geometries 202 in the data set 200 into patch geometries corresponding to the patches 210 that are associated with the anatomical face model 150. As described, each of the patches 210 represents a region on the skin of a face and is associated with a local deformation subspace defining how the patch 210 can deform from an average patch geometry that is an average of multiple patch geometries. In some embodiments, the multiple patch geometries that are averaged may be compressed geometries generated from segmented patch geometries associated with the patch 210, as discussed in greater detail below. Further, the anatomical face model 150 includes anatomical subspaces, which as described above, define how much respective patches 210 slide on underlying bone 212, in which directions the respective patches 210 slide, and skin thicknesses associated with the respective patches 210. Illustratively, the anatomical subspaces are determined by an anatomical subspace module 206 in the model generator 116. Techniques for determining local deformation subspaces and anatomical subspaces of an anatomical face model are disclosed in U.S. Pat. No. 9,652,890, entitled "Methods and Systems of Generating an Anatomically-Constrained Local Model for Performance Capture," which is incorporated by reference herein in its entirety. In some embodiments, to allow changes to skull and jaw bone shapes, parametric skull and jaw geometry models, as well as corresponding geometry coefficients, can be added to the anatomical face model disclosed in U.S. Pat. No. 9,652,890. In addition, if only the neutral expression is used, then a jaw motion parameter can be removed from the anatomical face model disclosed in U.S. Pat. No. 9,652,890.

As shown, the model generator 116 further includes a compression module 208 that compresses the local deformation subspaces and anatomical subspaces associated with the patches 210 in the anatomical face model 150. For example, if the data set 200 includes hundreds of captured facial geometries that are each segmented into patches, then each of the local deformation subspaces in the anatomical face model 150 would be a subspace having the hundreds of dimensions. However, solving an optimization problem for parameter values using such an anatomical face model 150 can be computationally expensive. In some embodiments, the compression module 208 can perform any technically feasible compression operation(s) to reduce the number of dimensions of the local deformation subspaces. The number of dimensions can be compressed because many of the segmented patch geometries associated with each patch 210 in the anatomical face model 150 may be similar. For example, the compression module 208 could perform principal component analysis (PCA) or spectral mesh compression to reduce the hundreds of segmented patch geometries associated with each patch 210, and corresponding hundreds of dimensions, to a few segmented patch geometries and dimensions. The reduced set of segmented patch geometries are also referred to herein as "compressed patch geometries." Experience has shown that five compressed patch geometries per patch 210 can enable a wide variety of facial geometries to be generated using the anatomical face model 150. Returning to the example of PCA, the compression module 208 could choose the top five eigenvectors resulting from the PCA as the compressed patch geometries, thereby providing a low-dimensional representation of a local deformation subspace.

In addition to compressing the local deformation subspaces of the anatomical face model 150, the compression module 208 can also compress the anatomical subspaces of the anatomical face model 150. It should be noted that the deformation subspace associated with each patch 210 is related one-to-one with the anatomical subspace associated with the same patch 210. For patches that are anatomically constrained, each patch geometry in a local deformation subspace has a corresponding location on a bone surface, a normal direction, and a skin thickness value, which form the anatomical constraints. As a result, when compressing the local deformation subspaces, the anatomical subspaces need to be compressed to the same dimensionality. To achieve such a compression, the compressed patch geometries associated with each of the patches 210 can be expressed as linear combinations of the original segmented patch geometries associated with that patch 210. In should be noted that different linear combinations of the original segmented patch geometries may be able to produce the compressed patch geometries. In some embodiments, an $L_1$ norm is used to identify as few of the original segmented patch geometries as possible that are needed to produce the compressed patch geometries, yielding a sparse solution. Once weights to use in the linear combination to produce the compressed patch geometries are determined, those same weights can be applied to skin thicknesses, points on bones, and bone normal directions to obtain new skin thicknesses, bone points, and bone normal directions corresponding to the compressed patch geometries. Doing so compresses the anatomical subspaces to be compatible with the compressed local deformation subspaces with associated compressed patch geometries.

In some embodiments, the model generator 116 can also determine characteristic differential shape vectors based on the data set 200. The characteristic differential shape vectors indicate how vertices in the patches 210 deform when characteristics, such as sex, age, ethnicity, and/or BMI, associated with the characteristic differential shape vectors change. That is, the characteristic differential shape vectors provide parametric control of facial geometry along associated, semantically meaningful dimensions. For example, a characteristic differential shape vector associated with BMI could indicate how vertices deform from lower to higher BMIs, and vice versa. In some embodiments, each characteristic differential shape vector may be a high dimensional vector determining the displacement of multiple vertices (that do not need to belong to a single patch) at once. For example, when a user selects a desired value for a characteristic (e.g., a particular BMI), the associated characteristic differential shape vectors could be used to determine modified vertex positions for a subset of vertices (5% of the total face vertices) that are then enforced as constraints during an optimization to solve for parameter values of the anatomical face model 150 for generating facial geometry corresponding to the value of the characteristic, as discussed in greater detail below in conjunction with FIGS. 6-7. Alternatively, all of the vertices could be used to determine the modified vertex positions. In some embodiments, the model generator 116 can use statistical modeling techniques to determine the characteristic differential shape vectors based on the captured facial geometries 202 of different individuals in the data set 200 and labels specifying different categories of the associated categories to which the facial geometries 202 belong. Returning to the example of BMI, a user could label the captured facial geometries 202 as belonging to different categories, such as below 18.5 BMI, from 18 to 24.9 BMI, from 25 to 29.9 BMI, and 30 and above BMI, etc., and the labeled facial geometries 202 could be used to determine characteristic differential shape vectors associated with BMI.

Figure 3:
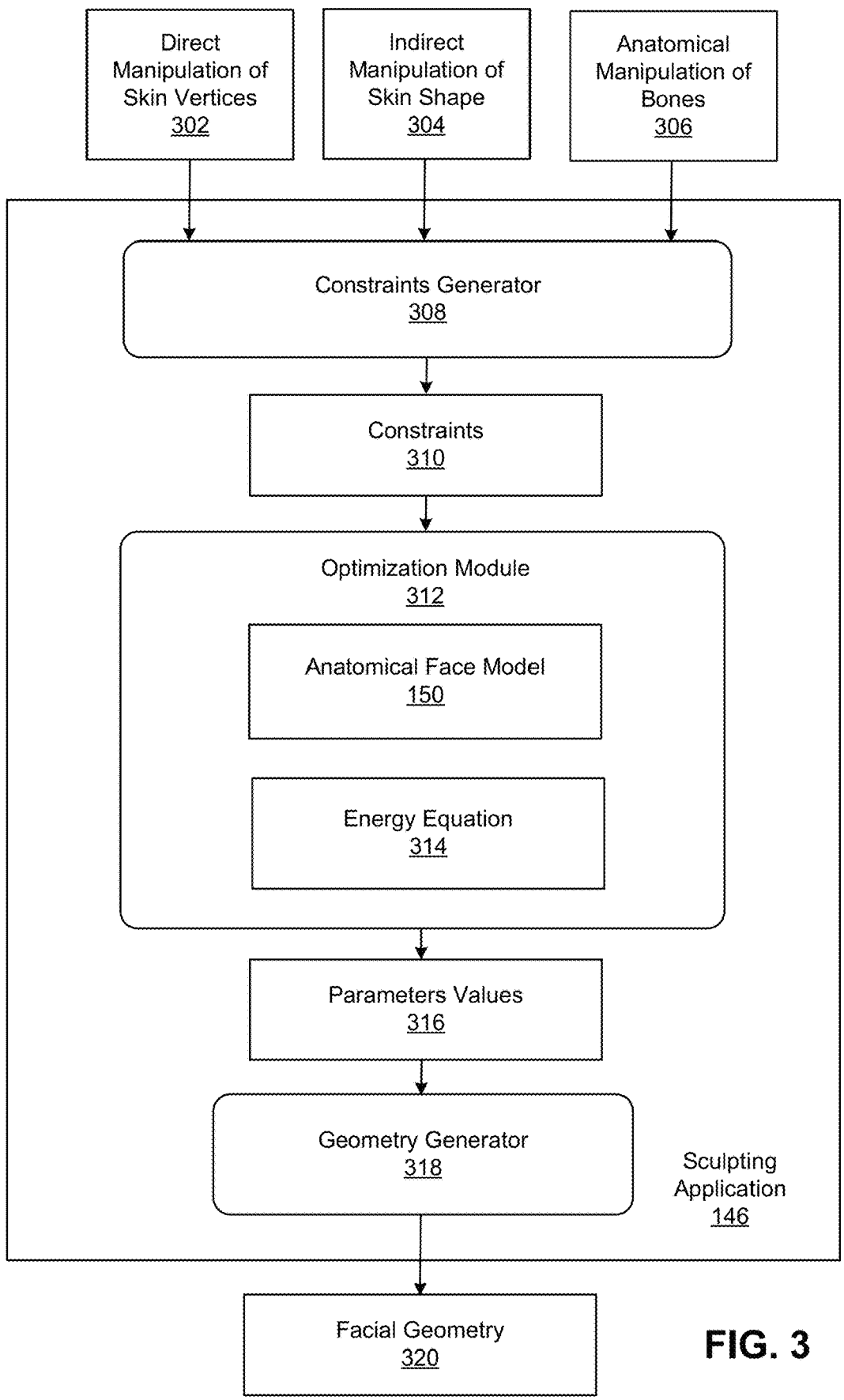
FIG. 3 is a more detailed illustration of the sculpting application of FIG. 1, according to various embodiments.

FIG. 3 is a more detailed illustration of the sculpting application 146 of FIG. 1, according to various embodiments. As shown, the sculpting application 146 includes a constraints generator 308, an optimization module 312, and a geometry generator 318. The constraints generator 308 receives user inputs that can include direct manipulation of vertices on the skin of a face 302, indirect manipulation of skin shape 304, and/or anatomical manipulation of bones 306.

Figure 4:
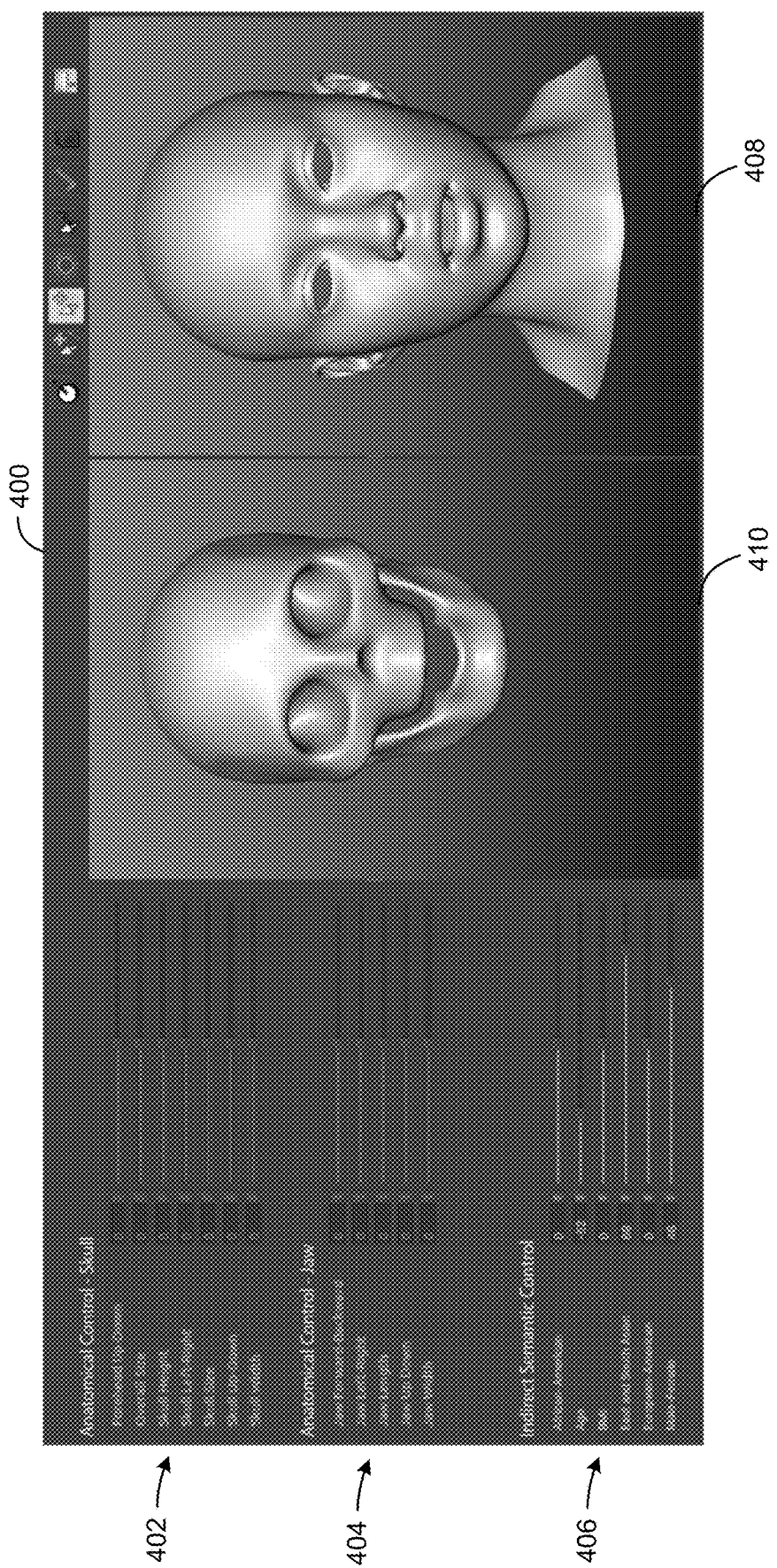
FIG. 4 illustrates an exemplar user interface associated with the sculpting application of FIG. 1, according to various embodiments.

FIG. 4 illustrates an exemplar user interface 400 associated with the sculpting application 146, via which the user can directly manipulate skin vertices, indirectly manipulate skin shape (i.e., the shape of facial geometry), and/or anatomically manipulate bones, according to various embodiments. As shown, the user interface 400 includes sections 408 and 410 depicting the skin and bone geometry, respectively, that are associated with a face being sculpted by a user. In some embodiments, the skin and bone geometry are displayed continuously in sync with each other, in terms of shape as well as pose.

In some embodiments, the sculpting process begins with a generic face that is computed as the average of faces in the dataset 200 that the anatomical face model 150 is generated from. As shown, the user interface 400 includes sets of sliders 402, 404, and 406 that can be adjusted to control the skull, jaw bone, and various semantics characteristics (e.g., sex, age, ethnicity, and BMI), respectively, that are associated with the face. Although described herein primarily with respect to sliders, in alternative embodiments, adjustments to the skull, jaw bone, and/or semantic characteristics can be specified by a user in any technically feasible manner, such as by entering a value into an input box, scrolling the scroll wheel on a mouse, pressing specific keys (e.g., the up and down arrows) on a keyboard, making hand gestures, etc. In addition to adjusting the sets of sliders 402, 404, and 406 (or otherwise specifying values for the skull, jaw bone, and semantic characteristics), the user can directly manipulate skin vertices by, e.g., selecting a vertex that is a handle in section 408 of the user interface 400 and repositioning the handle vertex to move a number of vertices associated with the handle vertex. In some embodiments, a subset of vertices of the facial geometry are handles that can be selected and dragged around by a user. Given such user inputs, the sculpting application 146 determines optimization constraints that are used to determine parameter values for the anatomical face model 150. In turn, the sculpting application 146 uses the parameter values and the anatomical face model 150 to generate new facial geometry that can be displayed to the user in section 408 of the user interface 400. For example, if the user adjusts a slider to increase the BMI associated with a face, the sculpting application 146 could determine optimization constraints associated with the increased BMI, compute parameter values for the anatomical face model by performing an optimization subject to the constraints, and generate new facial geometry associated with the increased BMI.

Figure 5:
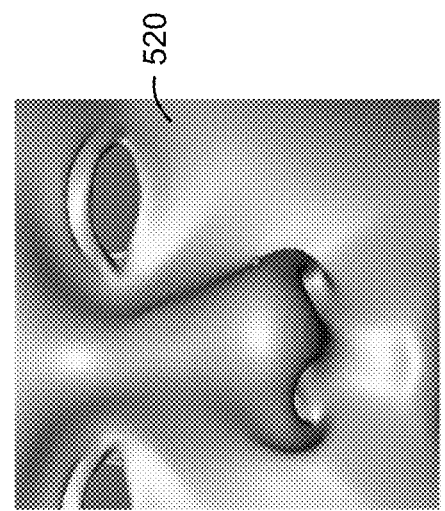
FIG. 5 illustrates how skin shape can be directly manipulated, according to various embodiments.
Figure 5:
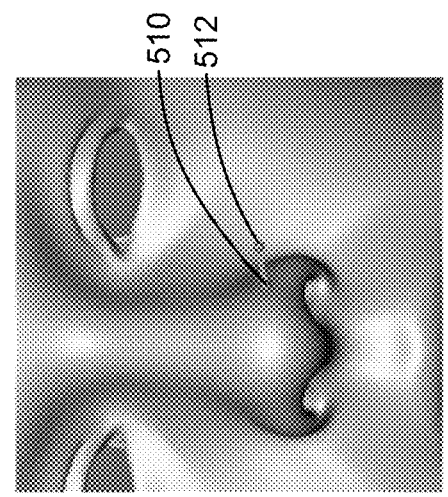
Figure 5:
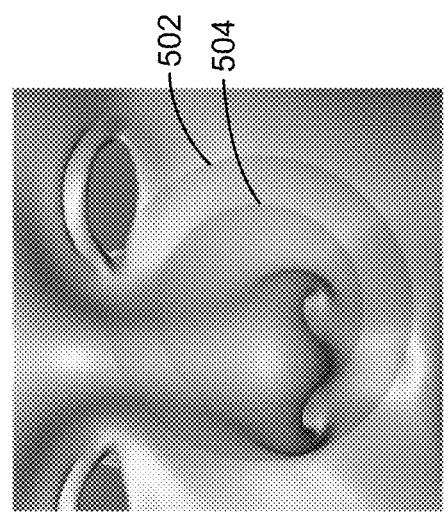

FIG. 5 illustrates how skin shape can be directly manipulated, according to various embodiments. As shown in panel A, a user first specifies a smaller region 504 that direct manipulation of vertices within the smaller region 504 affects. The user also specifies a larger region 502, outside of which the direct manipulation of vertices within the smaller region 504 have no effect. In some embodiments, the larger region 502 is required to be larger than, or equal in size to, the smaller region 502. The larger and smaller regions 502 and 504 define a region of influence of direct user manipulations of vertices within the smaller region 504. Between the larger and smaller regions 502 and 504, effects from the direct manipulation of the vertices within the smaller region 504 falls off based on weights specifying the degree to which different vertices in the in-between region must remain fixed. In embodiments, the larger and smaller regions 502 and 504 can be specified by the user in any technically feasible manner, such as clicking on a location with a mouse and scrolling a scroll wheel of the mouse to adjust the sizes of the larger and smaller regions 502 and 504. In some embodiments, default sizes of the larger and smaller regions 502 and 504 can also be provided by the sculpting application 146.

As shown in panel B, a user has moved a vertex that is a handle from an initial position 510 to a new position 512 after specifying the larger and smaller regions 502 and 504. For example, the user could click on and drag the handle vertex to the new position 512 via the user interface 400. The new position 512 of the handle vertex, as well as positions of other vertices that are affected by the movement of the handle vertex, can then be imposed as constraints during optimization of the anatomical face model 150, via an energy that is minimized during the optimization. Although described herein with respect to handles, in other embodiments, users may be permitted to move individual vertices and/or other points. Positions of vertices outside the larger region 502 can also be imposed as constraints via an energy during optimization, because those vertices are fixed. In some embodiments, only a limited number of vertices (e.g., 5% or less), which can be chosen at random, are actually constrained to be fixed. In addition, the vertex position constraints that are imposed during optimization of the anatomical face model 150 can be 3D and/or 2D constraints in some embodiments. For example, the user may only be able to specify 2D projection constraints given the current view matrix, in which case a constrained vertex can lie anywhere along a 3D ray rather than at an exact 3D position, as in the case of 3D constraints.

More formally, during optimization, the sculpting application 146 solves for local patch deformation coefficients $\{\alpha_i\}$ and rigid local patch motions $\{M_i\}$. In some embodiments, the sculpting application 146 minimizes the following energy during optimization:

$$E = E_M + E_P + E_O + E_A, \quad (1)$$

where $E_O$ and $E_A$ are overlap and anatomical energy terms, respectively, described in U.S. Pat. No. 9,652,890. The energy term $E_P$ is used to define 3D positional constraints over a set of constrained vertices V as $$E_P = \lambda_P \Sigma_{v \in V} \Sigma_{i \in \Omega(v)} w_v \|x_{v,i} - p_v\|^2, \quad (2)$$

where $x_{v,i}$ is an unknown 3D position of vertex v in patch i, $\Omega(v)$ is a set of patches that include vertex v, and $p_v$ is a user-defined constraint, such as a user-specified position of the vertex v. In addition, $\lambda_P$ is a weighting factor for the 3D positional constraints as a whole, and $w_v$ defines a per-vertex weight for the constraint associated with vertex v. Similarly, the $E_M$ term in equation (1) is used to define 2D positional constraints. Essentially, minimizing the energy of equation (1) during optimization minimizes a distance to the vertex constraints and an amount of overlap between neighboring patches, and further attempts to satisfy an anatomical constraint that couples the shape changes with corresponding skin sliding over the underlying bone(s), including corresponding skin thickness increases or decreases. Additional constraints, such as left-right facial symmetry, may also be imposed in other embodiments.

In some embodiments, minimizing the energy of equation (1) during optimization includes solving a least squares optimization problem using, e.g., the Gauss-Newton method or in any other technically-feasible manner. For example, a GPU-based nonlinear solver can be used to solve the least squares optimization problem and minimize the energy of equation (1) at interactive frame rates.

Panel C shows an updated facial geometry 520. As described, the sculpting application 146 solves for parameter values used to generate the updated facial geometry 520 by optimizing parameters associated with the anatomical face model 150 subject to the constraints described above. Using the optimized parameter values and the anatomical face model 150 itself, the sculpting application 146 can generate the updated facial geometry 520 by, among other things, determining geometries for each of the patches 210 by combining the compressed patch geometries associated with those patch 210 according to weight parameter values, moving the patches according to rigid motion parameter values associated with the patches, and stitching the resulting patch geometries together. More specifically, the different compressed patch geometries associated with each local deformation subspace can be combined in a linear combination that is weighted by the weight parameter values and transformed by a rigid transformation specified by the rigid motion parameter values, and the resulting patch geometries can then be stitched together. In some embodiments, the updated facial geometry 520 can be generated using a patch blending technique.

Figure 6:
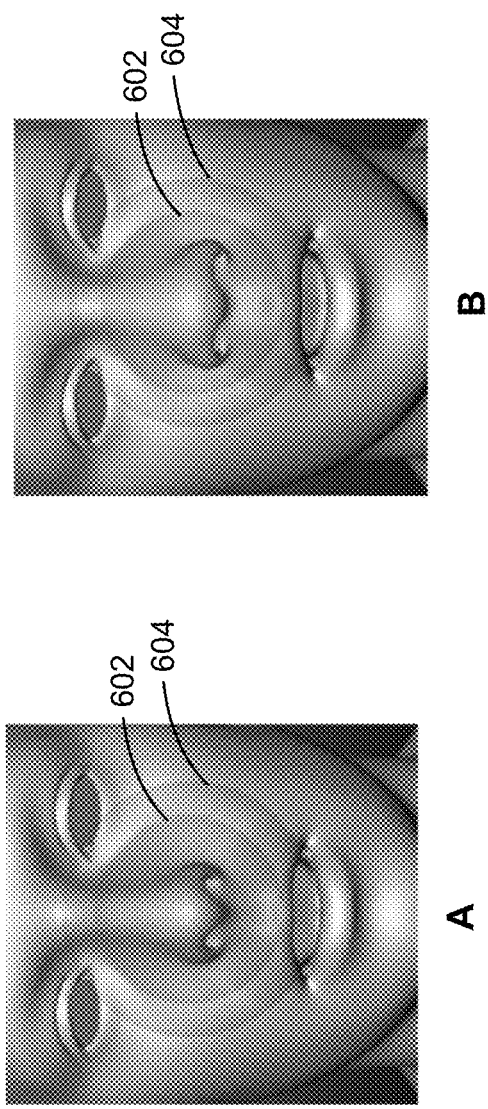
FIG. 6 illustrates how skin shape can be indirectly manipulated within a region of influence, according to various embodiments.

FIG. 6 illustrates how skin shape can be indirectly manipulated within a region of influence, according to various embodiments. In contrast to direct manipulation of facial geometry, indirect manipulation of facial geometry involves changing attribute(s), such as age, sex, BMI, and/or ethnicity, that cause the facial geometry to change accordingly as a by-product. As shown in panel A, a user first specifies a smaller region 602 that the indirect manipulation of facial geometry affects and a larger region 604, outside of which the indirect manipulation has no effect. The smaller and larger regions 602 and 604 define a region of influence of the indirect manipulations. Between the smaller and larger regions 602 and 604, effects from the indirect manipulation fall off based on weights specifying the degree to which different vertices in the in-between region must remain fixed.

After specifying the smaller and larger regions 602 and 604, the user can manipulate the facial geometry within those regions 602 and 604 via the user interface 400. As shown in panel B, the user has changed the ethnicity of a nose within the smaller and larger regions 602 and 604 by adjusting the semantic characteristic sliders 406 in the user interface 400. As described above in conjunction with FIG. 2, each of the semantic characteristics is associated with characteristic differential shape vectors specifying how vertices deform in response to adjustments to the semantic characteristics. For example, in the case of BMI, each of the characteristic differential shape vectors could indicate how multiple vertices, or a single vertex, in one or more patches deform from lower to higher BMI, and vice versa. In such a case, when a user adjusts the BMI of a face, the sculpting application 146 can determine, using the characteristic differential shape vectors associated with BMI, vertex displacements corresponding to the adjusted BMI. Similar to the manual manipulation of vertices described above in conjunction with FIG. 5, the vertex displacements determined by the sculpting application 146 can be used as constraints in the energy of equation (1) that the sculpting application 146 minimizes during optimization to determine parameter values for generating new facial geometry.

Figure 7:
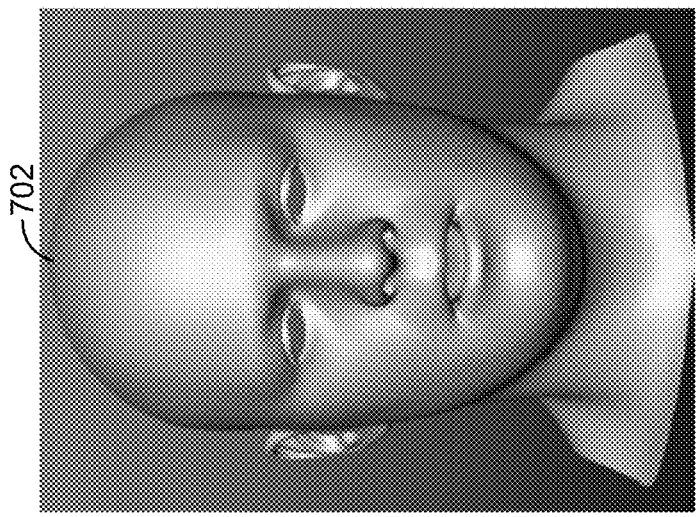
FIG. 7 illustrates how skin shape can be indirectly manipulated for an entire digital face, according to various embodiments.
Figure 7:
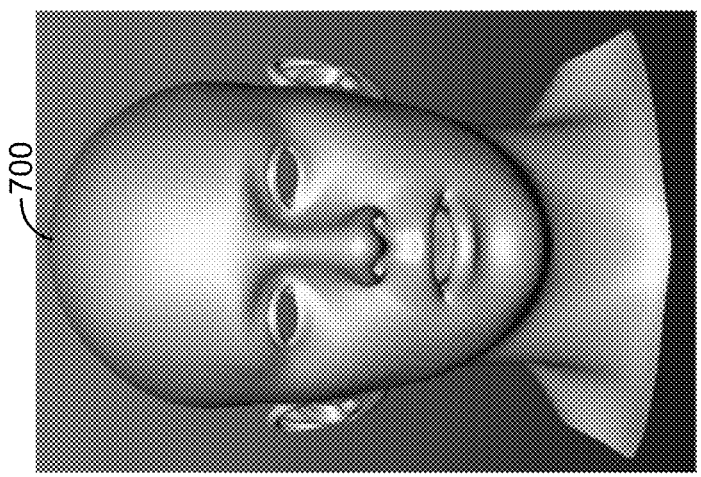

FIG. 7 illustrates how skin shape can be indirectly manipulated for an entire digital face, according to various embodiments. Panel A shows a facial geometry 700 associated with a low BMI, and panel B shows a facial geometry 702 that is generated via the anatomical face model 150 in response to user selection of a higher BMI. Similar to the discussion above in conjunction with FIG. 6, the user can select the higher BMI via the semantic characteristic sliders 406 in the user interface 400. Thereafter, the sculpting application 146 can determine vertex displacements for the entire face (as opposed to within a region of influence in the case described above in conjunction with FIG. 6) based on characteristic differential shape vectors, and the positions of the displaced vertices can be used as constraints during an optimization to determine parameter values for generating new facial geometry.

Figure 8:
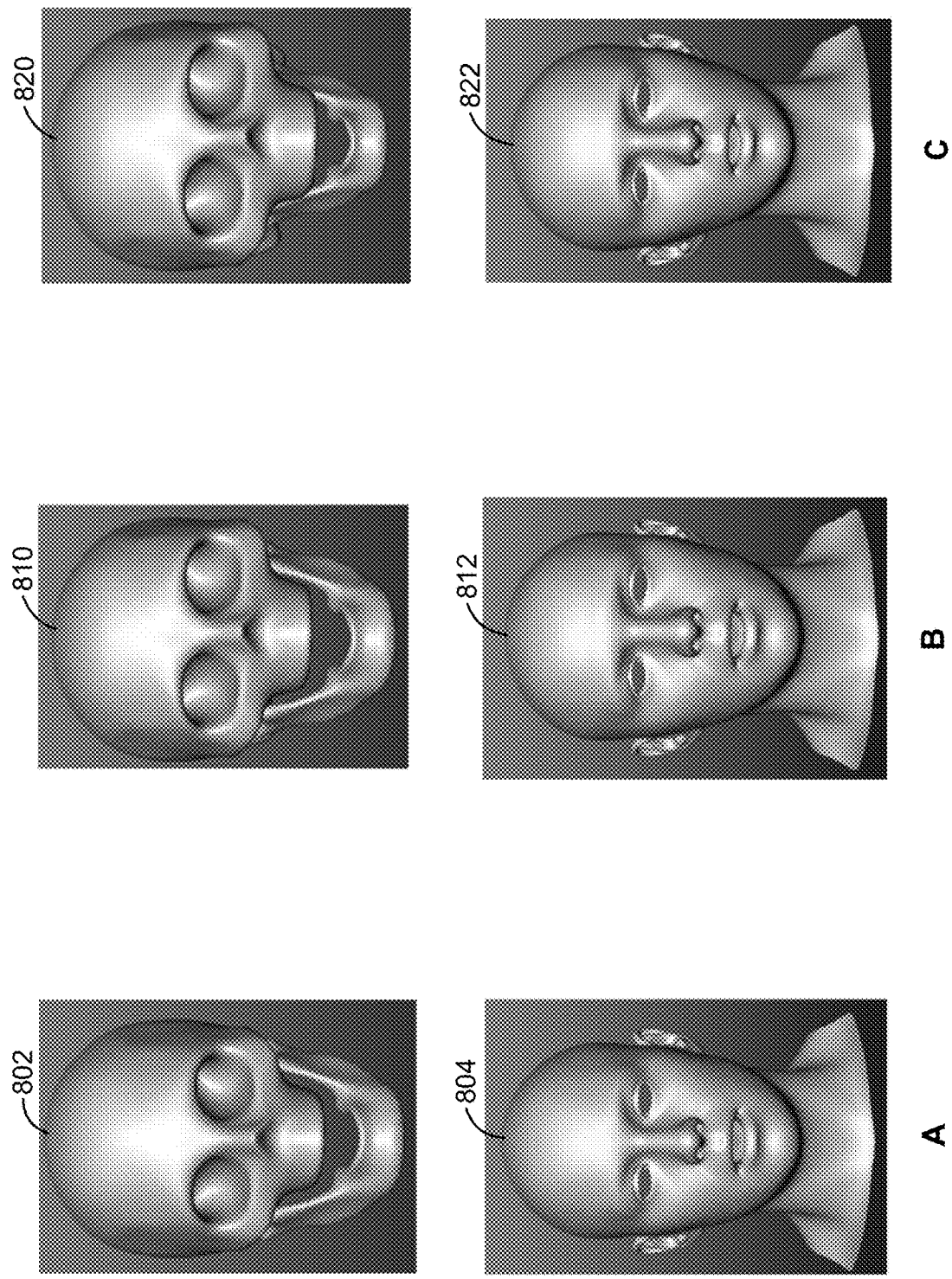
FIG. 8 illustrates how bones associated with a digital face can be manipulated to change the digital face, according to various embodiments.

FIG. 8 illustrates how bones associated with a digital face can be manipulated to change the digital face, according to various embodiments. In some embodiments, user changes to the shape and/or position of bone geometry are propagated to facial geometry, allowing the user to create various facial shapes by manipulating the underlying bones. Panel A shows bone geometry 802 representing a skull and a jaw bone, as well as corresponding facial geometry 804. As shown in panel B, a user has decreased a height and increased a width of the bone geometry 802, resulting in an updated bone geometry 810. Panel C shows a further update that decreases a size of the jaw bone and makes the jaw bone narrower (as compared to the updated bone geometry 810), resulting in an updated bone geometry 820. In embodiments, bone geometry can be manipulated in any technically feasible manner. For example, a user could directly edit vertices of bone geometry or otherwise sculpt and/or move the bone geometry. As another example, a user could adjust sliders, such as those described above in conjunction with FIG. 4, to manipulate bone geometry. In some embodiments, the characteristics of bone geometry (e.g., the forehead up-down, overall size, skull height, etc. shown in FIG. 4) that can be manipulated via sliders are determined from a data set of captured faces and associated bone geometry, such as the data set 200 described above in conjunction with FIG. 2. For example, PCA or other statistical techniques could be used to determine the characteristics that can be manipulated via sliders.

Experience has shown that PCA modes provide a meaningful bone geometry subspace because PCA modes define large, linear modes of change. Manipulating bones by changing PCA weight coefficients produces new vertex positions and normals for bone geometry, which as described above can prescribe anatomical constraints in the optimization to solve for parameter values associated with the anatomical face model 150. Updated facial geometry that corresponds to the updated bone geometry can then be generated based on those parameter values. Examples of updated facial geometries 812 and 822 that are generated based on the updated bone geometries 810 and 820, respectively, are shown in panels B and C, respectively. As shown, the facial geometry 812 generated based on the updated bone geometry 810 is associated with a wider face than the face associated with the facial geometry 804, and the facial geometry 820 generated based on the updated bone geometry 820 is associated with a wider face and a narrower jawline than the face associated with the facial geometry 804. It should be noted that techniques disclosed herein permit facial geometry to change plausibly as bone geometry is changed.

Returning to FIG. 3, the constraints generator 308 in the sculpting application 146 determines optimization constraints 310 based on the direct manipulation of skin vertices 302, the indirect manipulation of skin shape 304, and/or the anatomical manipulation of bones 306 that are received as user inputs. As described, the constraints can include vertex positions specified by the user or derived from indirect manipulations of semantic characteristics or bones by the user, and such vertex positions can be included as constraints in the energy of equation (1) that is minimized during optimization.

Thereafter, the optimization module 312 in the sculpting application 146 performs optimization based on the anatomical face model 150 and an energy equation 314, such as the energy of equation (1), to determine parameter values 316 associated with the anatomical face model 150 that can be used to generate new facial geometry. As described, the parameter values can include values for parameters specifying weights for combining different compressed patch geometries associated with the local deformation subspaces, as well rigid motions of every patch.

Illustratively, the geometry generator 318 generates facial geometry 320, which reflects the direct manipulation of skin vertices 302, the indirect manipulation of skin shape 304, and/or the anatomical manipulation of bones 306 that are received by the sculpting application 146 as inputs. As described, generating the facial geometry 320 can include combining the different compressed patch geometries associated with each local deformation subspace in a linear combination that is weighted by weight parameter values and transformed by a rigid transformation specified by rigid motion parameter values, and stitching the resulting patch geometries together. In some embodiments, the facial geometry 320 can be generated using a patch blending technique.

Although not shown, in some embodiments, the sculpting application 146 may also include a baking module. In such cases, after values for the model parameters 316 have been calculated, the baking module can update the local deformation subspace and the anatomical subspace associated with each patch of the anatomical face model 150 as a new neutral. As a result, a user can perform one or more sculpting operations that result in a given set of optimization constraints being applied to solve for parameter values associated with the anatomical face model 150, bake the results into the anatomical face model 150 to generate an updated anatomical face model, perform additional sculpting operation(s) that result in another set of optimization constraints being applied to solve for parameter values associated with the updated anatomical face model, etc. It should be understood that such baking removes existing constraints and allows further edits to be made with a "blank slate" of constraints, thereby reducing the number of constraints that are applied during each optimization. Doing so can improve the speed with which optimization operations are performed and the results of the optimization operations, because multiple constraints can compete with each other during optimization and reduce the effects of each constraint. In addition, it can be difficult to simultaneously perform direct, indirect, and anatomical manipulations, because the various constraints from such manipulations may invalidate each other. In some embodiments, baking is required when switching between direct, indirect, and anatomical manipulation modes. More generally, baking can be performed as frequently as a user desires, e.g., from continuously baking after each edit to baking only once after finishing with a direct, indirect, or anatomical manipulation mode. Experience has shown that the most natural workflow is to bake after sufficiently completing edits to each local region of a face.

More formally, baking is the process of applying the current user-provided edits to the anatomical face model 150 in such a way that the resulting baked model, with constraints associated with the current edits removed, produces the same facial geometry as the unbaked model with the constraints applied. Baking requires the anatomical face model 150 to be updated such that, without the user-defined constraints, the optimization energy of equation (1) is zero without changing the facial geometry. In equation (1), the $E_M$ and $E_P$ terms will trivially resolve to zero as user-specified projection and position constraints are removed. The overlap energy $E_O$ can also be made zero by replacing the mean geometry of each patch 210 with the corresponding local deformation of the current facial geometry, and zeroing out the deformation coefficients $\{\alpha_i\}$. The deformation subspace differentials can also be updated to be the original subspace geometry minus the new mean, such that the anatomical face model 150 provides the same subspace variation as before. As to the anatomical energy $E_A$, the underlying bones in the anatomical face model 150 can be continuously updated to the current user-edited bone geometry, so all that remains is to compute a 3D offset for each anatomical constraint such that, when evaluated with a current bone, a residual with respect to the baked geometry is zero.

In addition to the baking module, in some embodiments, the sculpting application 146 may include a rendering module (not shown) that renders facial geometry generated using the anatomical face model 150 and optimized parameter values, as well as facial geometries generated using the anatomical face model 150 with optimized parameter values baked in. The rendered image(s) can then be displayed to a user during, e.g., an interactive sculpting process.

Figure 9:
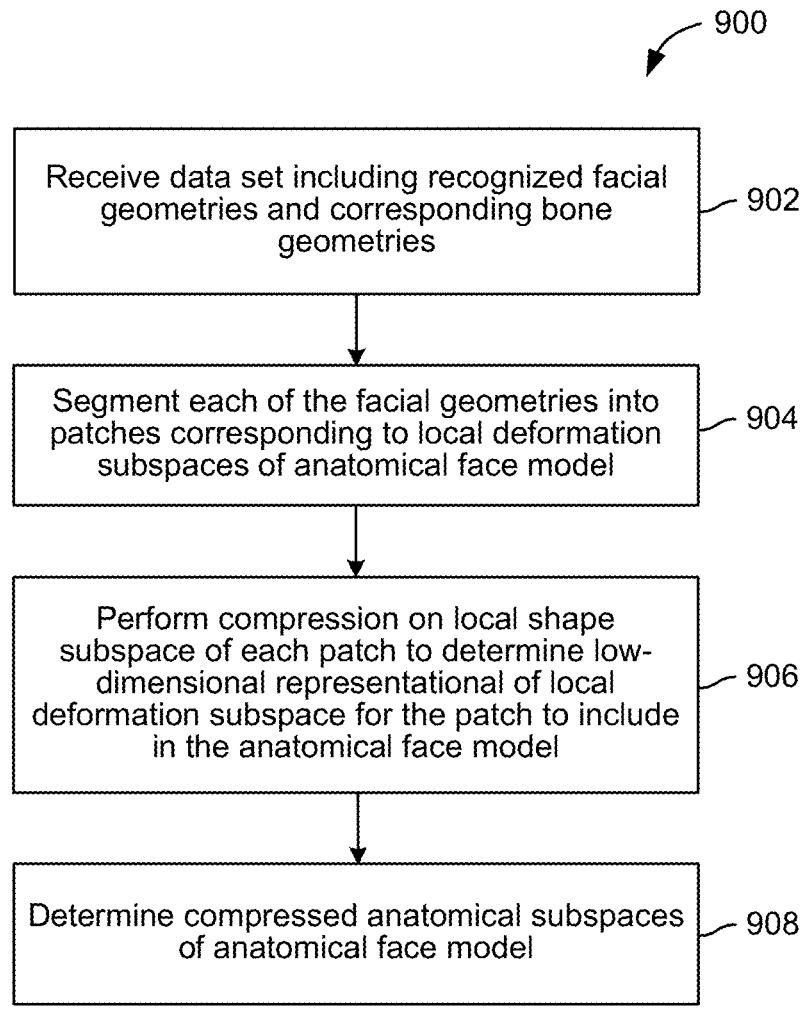
FIG. 9 sets forth a flow diagram of method steps for generating an anatomical face model, according to various embodiments.

FIG. 9 sets forth a flow diagram of method steps for generating an anatomical face model, according to various embodiments. Although the method steps are described in conjunction with the systems of FIGS. 1-2, persons of ordinary skill in the art will understand that any system configured to perform the method steps, in any order, is within the scope of the present disclosure.

As shown, a method 900 begins at step 902, where the model generator 116 receives a data set that includes facial geometries and corresponding bone geometries. The facial geometries and corresponding bone geometries can be determined in any technically feasible manner, including using well-known facial capture techniques and by estimating bone geometry associated with the captured faces.

At step 904, the model generator 116 segments each of the facial geometries into patches corresponding to local deformation subspaces of an anatomical face model. As described, any number of patches, in any patch layout, may be used in embodiments.

At step 906, the model generator 116 performs compression on a local deformation subspace associated with each patch to determine a low-dimensional representation of the local deformation subspace for the patch to include in the anatomical face model 150. Any technically feasible compression may be used, such as PCA or spectral mesh compression. In some embodiments, the compression includes determining a linear combination of segmented patch geometries associated with each of compressed patch geometry.

At step 908, the model generator 116 determines compressed anatomical subspaces of the anatomical face model corresponding to the compressed local deformation subspaces. As described, the compression at step 906 can include determining a linear combination of segmented patch geometries associated with each compressed patch geometry. In such cases, to obtain the compressed anatomical subspaces, weights in the linear combination can be applied to skin thicknesses, points on bones, and bone normal directions to obtain new skin thicknesses, bone points, and bone normal directions corresponding to the compressed patch geometries, thereby producing compressed anatomical subspaces.

Figure 10:
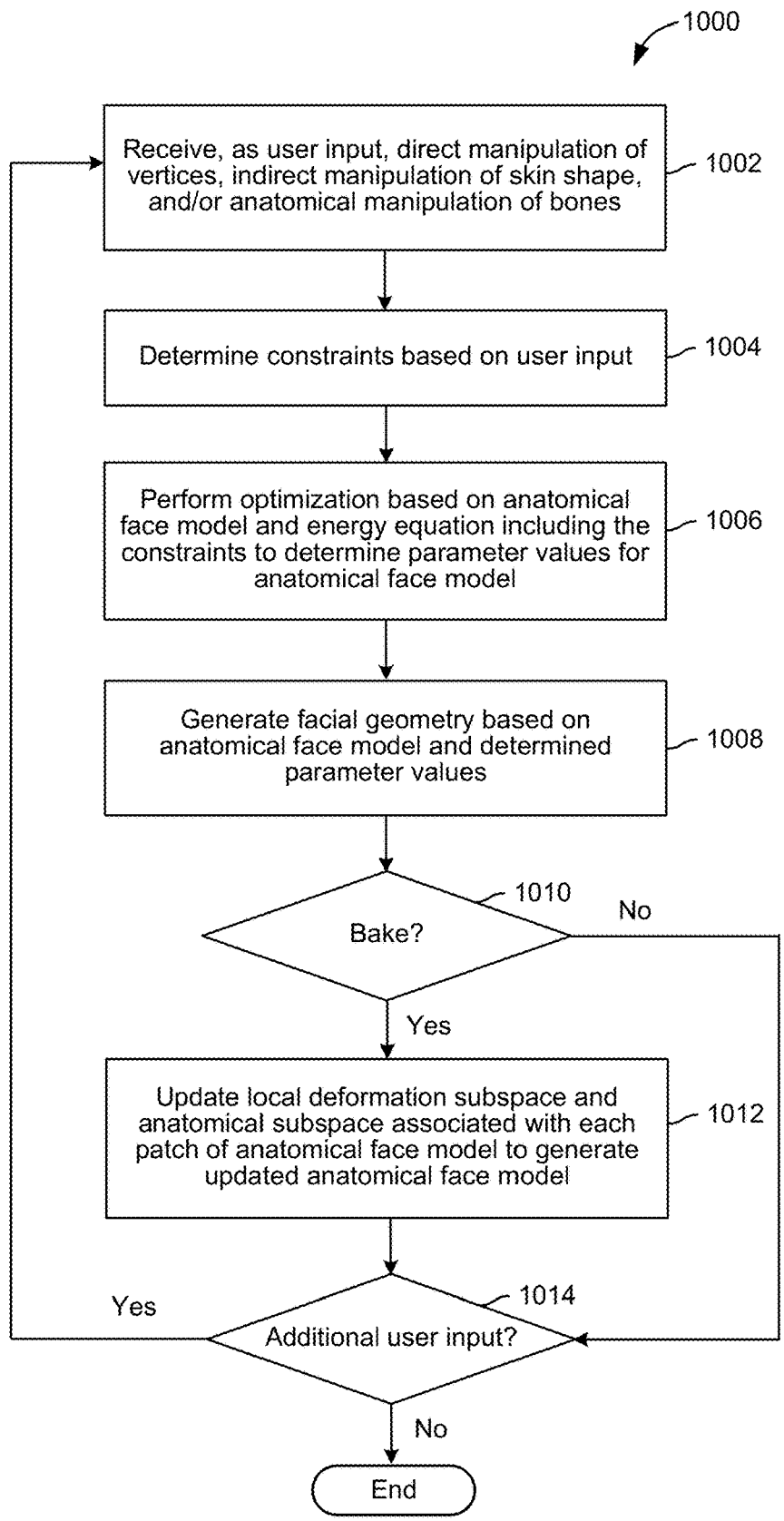
FIG. 10 sets forth a flow diagram of method steps for generating facial geometry based on an anatomical face model, according to various embodiments.

FIG. 10 sets forth a flow diagram of method steps for generating facial geometry based on an anatomical face model, according to various embodiments. Although the method steps are described in conjunction with the systems of FIGS. 1 and 3, persons of ordinary skill in the art will understand that any system configured to perform the method steps, in any order, is within the scope of the present disclosure.

As shown, a method 1000 begins at step 1002, where the sculpting application 146 receives, as user input, direct manipulation of vertices, indirect manipulation of skin shape, and/or anatomical manipulation of bones. Any suitable user interface, such as the user interface 400 described above in conjunction with FIGS. 4-8, can be used to specify the user input.

At step 1004, the sculpting application 146 determines optimization constraints based on the user input. As described, the optimization constraints can include vertex positions specified by the user or derived from indirect manipulations of semantic characteristics or bones by the user, and such vertex positions can be included as constraints in the energy of equation (1) that is minimized during optimization.

At step 1006, the sculpting application 146 performs optimization based on the anatomical face model 150 and an energy equation including the constraints to determine parameter values for the anatomical face model 150. In some embodiments, the energy that is minimized has the form shown in equation (1), and the parameters whose values are optimized include weight parameter values for combining different compressed patch geometries associated with the local deformation subspaces, as well rigid motion parameter values, associated with each patch.

At step 1008, the sculpting application 146 generates facial geometry based on the anatomical face model and the determined parameter values. As described, the sculpting application 146 can generate the facial geometry by, for each patch, combining the different compressed patch geometries associated with the associated local deformation subspace in a linear combination that is weighted by weight parameter values and transformed by a rigid transformation specified by rigid motion parameter values, and stitching the resulting patch geometries together. In addition, the sculpting application 146 can render the facial geometry in one or more images that are displayed to the user. Doing so permits the user to see effects of the input at step 1002, and to interactively sculpt the face.

At step 1010, if the determined parameter values are to be baked into the anatomical face model, then the method 1000 continues to step 1012, where the sculpting application 146 updates the local deformation subspace and the anatomical subspace associated with each patch of the anatomical face model to generate an updated anatomical face model. As described, baking can be performed as frequently as a user desires.

On the other hand, if the parameter values are not be baked into the anatomical face model, then the method 1000 proceeds directly to step 1014. At step 1014, if there is additional user input, then the method 1000 returns to step 1002, where the sculpting application 146 receives, as user input, additional direct manipulation of vertices, indirect manipulation of skin shape, and/or anatomical manipulation of bones. Thereafter, when the optimization in step 1006 is reached, an updated anatomical face model is used if the anatomical face model was previously updated via baking at step 1012.

In sum, a model generator generates an anatomical face model from a data set including captured facial geometries of different individuals and associated bone geometries. The anatomical face model includes local deformation subspaces defining how multiple patches of skin on a face can deform, as well as anatomical subspaces defining how much the patches slide on underlying bone, which directions the patches slide, and skin thicknesses associated with the patches. To generate the anatomical face model, the model generator segments each of the captured facial geometries of individuals into patches, compresses the segmented geometry associated with each patch to determine the local deformation subspaces, and determines corresponding compressed anatomical subspaces. Subsequently, the anatomical face model can be used to generate new facial geometry. Given user input that includes direct manipulation of skin vertices, indirect manipulation of skin shape, and/or anatomical manipulation of bones, a sculpting application determines constraints for an optimization that is performed to solve for parameters associated with the anatomical face model. The optimization can be repeated multiple times, with the results of optimization being baked into the anatomical face model based on user preference to generate an updated anatomical face model. The parameter values that are determined via optimization can then be used, along with the (updated) anatomical face model, to generate facial geometry that reflects the user input.

At least one technical advantage of the disclosed techniques relative to the prior art is that the disclosed techniques enable digital faces with a wide variety of characteristics to be created by users who are not skilled at free-form sculpting. In addition, the disclosed techniques enable realistic-looking digital faces to be created in shorter amounts of time relative to prior art approaches, such as free-form sculpting. These technical advantages represent one or more technological improvements over prior art approaches.

1. In some embodiments, a computer-implemented method for generating a digital face comprises generating a model based on a plurality of different faces associated with a plurality of different individuals, wherein the model comprises a plurality of local deformation subspaces defining how patches of skin deform and a plurality of anatomical subspaces defining at least one of how the patches slide on underlying bones, which directions the patches slide, or skin thicknesses associated with the patches, performing one or more optimization operations based on the model and one or more constraints to determine parameter values associated with the model, and generating three-dimensional (3D) facial geometry based on the parameter values and the model.

2. The computer-implemented method of clause 1, further comprising receiving, via one or more user-specified sculpting operations, one or more characteristics associated with the facial geometry, and determining the one or more constraints based on the one or more characteristics.

3. The computer-implemented method of clauses 1 or 2, wherein the one or more characteristics comprise positions of one or more points included in the facial geometry.

4. The computer-implemented method of any of clauses 1-3, wherein the one or more characteristics comprise at least one of age, sex, body mass index, or ethnicity, and determining the one or more constraints comprises computing vertex displacements based on the one or more characteristics and a plurality of differential shape vectors that map changes in the one or more characteristics to changes in positions of vertices in the facial geometry.

5. The computer-implemented method of any of clauses 1-4, wherein the one or more characteristics comprise at least one characteristic of a skull or jaw bone associated with the facial geometry.

6. The computer-implemented method of any of clauses 1-5, wherein each local deformation subspace included in the plurality of local deformation subspaces is compressed to reduce a dimensionality associated with the plurality of different faces of the plurality of different individuals.

7. The computer-implemented method of any of clauses 1-6, wherein performing the one or more optimization operations comprises performing one or more operations to minimize an energy equation that includes the one or more constraints.

8. The computer-implemented method of any of clauses 1-7, wherein performing the one or more optimization operations comprises performing one or more operations to minimize an energy equation that includes at least one term specifying 3D positional constraints over a set of constrained vertices.

9. The computer-implemented method of any of clauses 1-8, further comprising updating the model based on the parameter values.

10. In some embodiments, one or more non-transitory computer-readable storage media include instructions that, when executed by one or more processing units, cause the one or more processing units to generate a digital face, by performing the steps of generating a model based on a plurality of different faces associated with a plurality of different individuals, wherein the model comprises a plurality of local deformation subspaces defining how patches of skin deform and a plurality of anatomical subspaces defining at least one of how the patches slide on underlying bones, which directions the patches slide, or skin thicknesses associated with the patches, performing one or more optimization operations based on the model and one or more constraints to determine parameter values associated with the model, and generating three-dimensional (3D) facial geometry based on the parameter values and the model.

11. The one or more non-transitory computer-readable storage media of clause 10, wherein generating the model comprises determining respective facial geometries and bone geometries associated with each face of the plurality of different faces, and wherein the model is generated based on the facial geometries and the bone geometries.

12. The one or more non-transitory computer-readable storage media of clauses 10 or 11, wherein each local deformation subspace included in the plurality of local deformation subspaces is compressed to reduce a dimensionality associated with the plurality of different faces of the plurality of different individuals.

13. The one or more non-transitory computer-readable storage media of any of clauses 10-12, the steps further comprising receiving, via one or more user-specified sculpting operations, one or more characteristics associated with the facial geometry and one or more regions of the facial geometry that are affected by the one or more characteristics, and determining the one or more constraints based on the one or more characteristics and the one or more regions of the facial geometry that are affected by the one or more characteristics.

14. The one or more non-transitory computer-readable storage media of any of clauses 10-13, wherein the one or more characteristics comprise positions of one or more points included in the facial geometry.

15. The one or more non-transitory computer-readable storage media of any of clauses 10-14, wherein the one or more characteristics comprise at least one of age, sex, body mass index, or ethnicity, and determining the one or more constraints comprises computing vertex displacements based on the one or more characteristics and a plurality of differential shape vectors that map changes in the one or more characteristics to changes in positions of vertices in the facial geometry.

16. The one or more non-transitory computer-readable storage media of any of clauses 10-15, wherein the one or more characteristics comprise at least one characteristic of a skull or jaw bone associated with the facial geometry.

17. The one or more non-transitory computer-readable storage media of any of clauses 10-16, the steps further comprising capturing each face included in the plurality of different faces with a neutral facial expression.

18. The one or more non-transitory computer-readable storage media of any of clauses 10-17, the steps further comprising rendering at least one image using the 3D facial geometry.

19. In some embodiments, a system comprises one or more memories that include instructions, and one or more processors that are coupled to the one or more memories and, when executing the instructions generate a model based on a plurality of different faces associated with a plurality of different individuals, wherein the model comprises a plurality of local deformation subspaces defining how patches of skin deform and a plurality of anatomical subspaces defining at least one of how the patches slide on underlying bones, which directions the patches slide, or skin thicknesses associated with the patches, perform one or more optimization operations based on the model and one or more constraints to determine parameter values associated with the model, and generate three-dimensional (3D) facial geometry based on the parameter values and the model.

20. The system of clause 19, wherein the one or more processors, when executing the instructions, further receive, via one or more user-specified sculpting operations, one or more characteristics associated with the facial geometry, and determine the one or more constraints based on the one or more characteristics.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a digital face, the method comprising:
   segmenting a plurality of facial geometries associated with a plurality of different individuals into a first plurality of patch geometries corresponding to a plurality of patches of skin;
   generating, based on the segmented plurality of facial geometries, a plurality of local deformation subspaces defining how the plurality of patches deform, wherein each local deformation subspace included in the plurality of local deformation subspaces is generated based on an aggregation of a second plurality of patch geometries corresponding to a subset of the first plurality of patch geometries for a patch included in the plurality of patches;
   generating, based on a plurality of bone geometries associated with the plurality of different individuals, a plurality of anatomical subspaces defining at least one of how the plurality of patches slide on underlying bones, in which directions the plurality of patches slide, or skin thicknesses associated with the plurality of patches, wherein each anatomical subspace included in the plurality of anatomical subspaces is generated based on an aggregation of a portion of the plurality of bone geometries associated with a patch included in the plurality of patches;
   performing one or more optimization operations based on (i) a model that includes the plurality of local deformation subspaces and the plurality of anatomical subspaces and (ii) one or more constraints to determine parameter values associated with the model; and
   generating a three-dimensional (3D) facial geometry based on the parameter values and the model.

2. The computer-implemented method of claim 1, further comprising:
   receiving, via one or more user-specified sculpting operations, one or more characteristics associated with the 3D facial geometry; and
   determining the one or more constraints based on the one or more characteristics.

3. The computer-implemented method of claim 2, wherein the one or more characteristics comprise positions of one or more points included in the 3D facial geometry.

4. The computer-implemented method of claim 2, wherein the one or more characteristics comprise at least one of age, sex, body mass index, or ethnicity, and determining the one or more constraints comprises computing vertex displacements based on the one or more characteristics and a plurality of differential shape vectors that map changes in the one or more characteristics to changes in positions of vertices in the 3D facial geometry.

5. The computer-implemented method of claim 2, wherein the one or more characteristics comprise at least one characteristic of a skull or jaw bone associated with the plurality of bone geometries.

6. The computer-implemented method of claim 1, wherein generating the plurality of local deformation subspaces comprises compressing the second plurality of patch geometries within each local deformation subspace included in the plurality of local deformation subspaces to reduce a dimensionality associated with the second plurality of patch geometries.

7. The computer-implemented method of claim 1, wherein performing the one or more optimization operations comprises performing one or more operations to minimize an energy equation that includes the one or more constraints.

8. The computer-implemented method of claim 1, wherein performing the one or more optimization operations comprises performing one or more operations to minimize an energy equation that includes at least one term specifying 3D positional constraints over a set of constrained vertices.

9. The computer-implemented method of claim 1, further comprising updating the model based on the parameter values.

10. The computer-implemented method of claim 1, further comprising determining the plurality of bone geometries by deforming and fitting a template skull inside the plurality of facial geometries.

11. One or more non-transitory computer-readable storage media including instructions that, when executed by one or more processing units, cause the one or more processing units to generate a digital face, by performing the steps of:
    segmenting a plurality of facial geometries associated with a plurality of different individuals into a first plurality of patch geometries corresponding to a plurality of patches of skin;
    generating, based on the segmented plurality of facial geometries, a plurality of local deformation subspaces defining how the plurality of patches deform, wherein each local deformation subspace included in the plurality of local deformation subspaces is generated based on an aggregation of a second plurality of patch geometries corresponding to a subset of the first plurality of patch geometries for a patch included in the plurality of patches;
    generating, based on a plurality of bone geometries associated with the plurality of different individuals, a plurality of anatomical subspaces defining at least one of how the plurality of patches slide on underlying bones, in which directions the plurality of patches slide, or skin thicknesses associated with the plurality of patches, wherein each anatomical subspace included in the plurality of anatomical subspaces is generated based on an aggregation of a portion of the plurality of bone geometries associated with a patch included in the plurality of patches;
    performing one or more optimization operations based on (i) a model that includes the plurality of local deformation subspaces and the plurality of anatomical subspaces and (ii) one or more constraints to determine parameter values associated with the model; and
    generating a three-dimensional (3D) facial geometry based on the parameter values and the model.

12. The one or more non-transitory computer-readable storage media of claim 11, wherein generating the plurality of local deformation subspaces comprises computing each local deformation subspace included in the plurality of local deformation subspaces based on an average of the second plurality of patch geometries for a corresponding patch.

13. The one or more non-transitory computer-readable storage media of claim 11, wherein generating the plurality of local deformation subspaces comprises compressing the second plurality of patch geometries within each local deformation subspace included in the plurality of local deformation subspaces to reduce a dimensionality associated with the second plurality of patch geometries.

14. The one or more non-transitory computer-readable storage media of claim 11, wherein the instructions that, when executed by one or more processing units, cause the one or more processing units to further perform the steps of:
receiving, via one or more user-specified sculpting operations that manipulate at least one of one or more vertices, a skin shape, or one or more bones associated with the 3D facial geometry, one or more characteristics associated with the 3D facial geometry and one or more regions of the 3D facial geometry that are affected by the one or more characteristics; and
determining the one or more constraints based on the one or more characteristics and the one or more regions of the 3D facial geometry that are affected by the one or more characteristics.

15. The one or more non-transitory computer-readable storage media of claim 14, wherein the one or more characteristics comprise positions of one or more points included in the 3D facial geometry.

16. The one or more non-transitory computer-readable storage media of claim 14, wherein the one or more characteristics comprise at least one of age, sex, body mass index, or ethnicity, and determining the one or more constraints comprises computing vertex displacements based on the one or more characteristics and a plurality of differential shape vectors that map changes in the one or more characteristics to changes in positions of vertices in the 3D facial geometry.

17. The one or more non-transitory computer-readable storage media of claim 11, wherein the instructions that, when executed by one or more processing units, cause the one or more processing units to further perform the step of capturing each facial geometry included in the plurality of facial geometries with a neutral facial expression.

18. The one or more non-transitory computer-readable storage media of claim 11, wherein the instructions that, when executed by one or more processing units, cause the one or more processing units to further perform the step of rendering at least one image using the 3D facial geometry.

19. A system, comprising:
one or more memories that include instructions; and
one or more processors that are coupled to the one or more memories and, when executing the instructions:
segment a plurality of facial geometries associated with a plurality of different individuals into a first plurality of patch geometries corresponding to a plurality of patches of skin,
generate, based on the segmented plurality of facial geometries, a plurality of local deformation subspaces defining how the plurality of patches deform, wherein each local deformation subspace included in the plurality of local deformation subspaces is generated based on an aggregation of a second plurality of patch geometries corresponding to a subset of the first plurality of patch geometries for a patch included in the plurality of patches,
generate, based on a plurality of bone geometries associated with the plurality of different individuals, a plurality of anatomical subspaces defining at least one of how the plurality of patches slide on underlying bones, in which directions the plurality of patches slide, or skin thicknesses associated with the plurality of patches, wherein each anatomical subspace included in the plurality of anatomical subspaces is generated based on an aggregation of a portion of the plurality of bone geometries associated with a patch included in the plurality of patches,
perform one or more optimization operations based on (i) a model that includes the plurality of local deformation subspaces and the plurality of anatomical subspaces and (ii) one or more constraints to determine parameter values associated with the model, and
generate a three-dimensional (3D) facial geometry based on the parameter values and the model.

20. The system of claim 19, wherein the one or more processors, when executing the instructions, further:
receive, via one or more user-specified sculpting operations, one or more characteristics associated with the 3D facial geometry; and
determine the one or more constraints based on the one or more characteristics.

* * * * *